United States Patent [19]

Purdon

[11] 4,343,577
[45] Aug. 10, 1982

[54] DEBURRING TOOL

[76] Inventor: Jerome R. Purdon, 3677 E. Washington Rd., Carsonville, Mich. 48419

[21] Appl. No.: 168,051

[22] Filed: Jul. 14, 1980

[51] Int. Cl.$^3$ .............................................. B23B 51/10
[52] U.S. Cl. .................................... 408/226; 408/714
[58] Field of Search ............... 408/156, 211, 194, 226, 408/127, 714; 407/8, 9

[56] References Cited

U.S. PATENT DOCUMENTS

| 2,739,497 | 3/1956 | Fried et al. | 408/156 |
| 2,895,356 | 7/1959 | Cogsdill | 408/714 |
| 3,420,125 | 1/1969 | Cogsdill | 408/226 |

FOREIGN PATENT DOCUMENTS 1290412  3/1969  Fed. Rep. of Germany ...... 408/226

*Primary Examiner*—Leonidas Vlachos
*Attorney, Agent, or Firm*—McGlynn and Milton

[57] ABSTRACT

A deburring tool including an axially elongated tool holder and a cutting blade. The tool holder includes a first body portion adapted for attachment to a rotatable driving member and a second body portion extending axially from the first body portion and including a slot having seating shoulders for seating a cutting blade. The first and second body portions are joined by a flexible neck portion allowing the second body portion to flex in cantilever fashion relative to the first body portion as the tool holder is rotated. A cutting blade having seating shoulders is removably mounted within the tool holder such that the seating shoulders of the cutting blade are seated against the seating shoulders of the tool holder.

7 Claims, 4 Drawing Figures

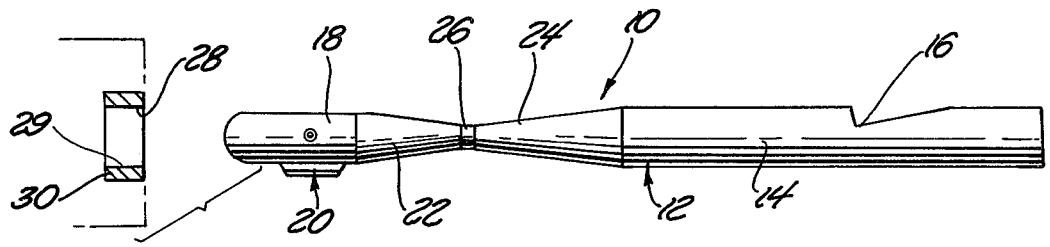
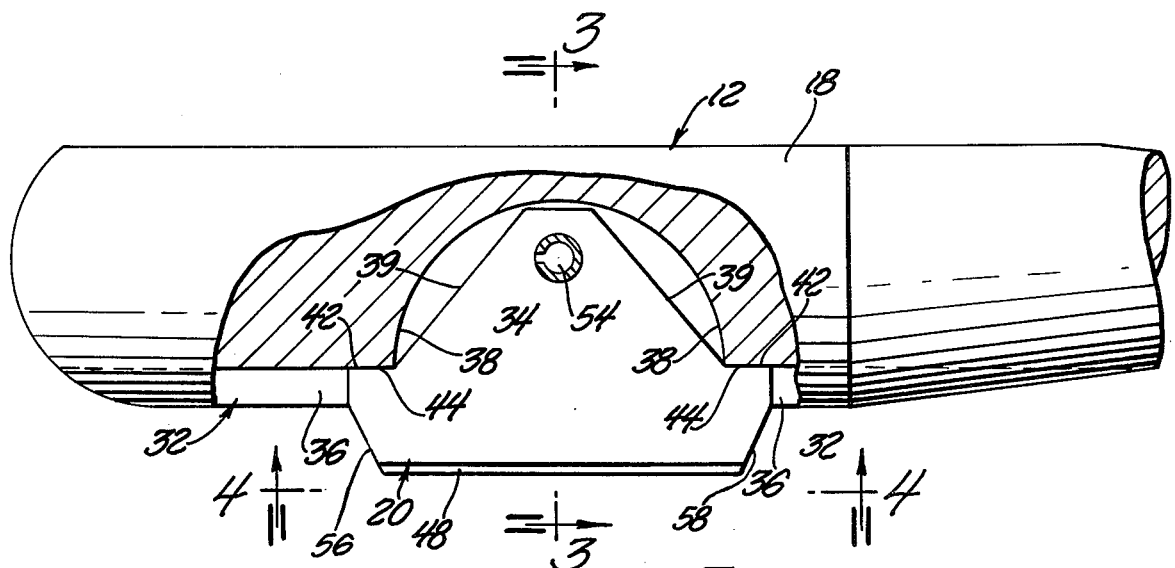
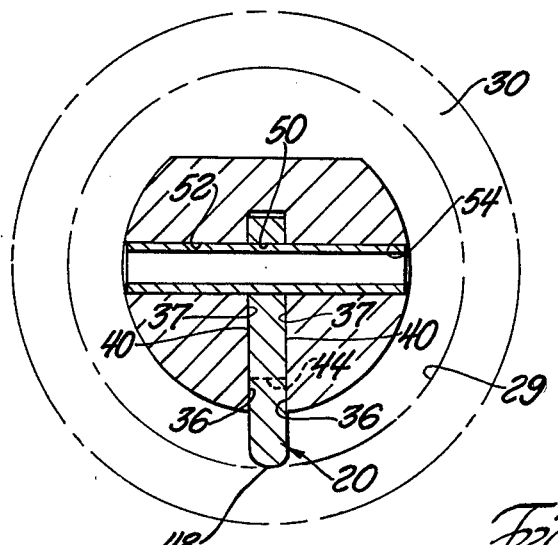
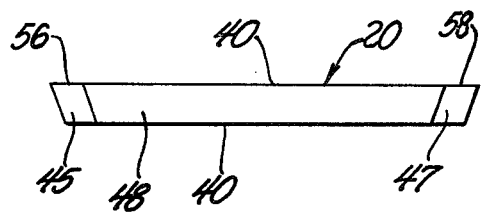

DEBURRING TOOL

BACKGROUND OF THE INVENTION (1) Field of the Invention

The instant invention relates to deburring tools which utilize a removable cutting insert and include means which allow the deburring tool to flex when passed through an aperture.

(2) Description of the Prior Art

Prior art patents have taught deburring tools which include a replaceable blade and means for allowing the blade to flex upon entering an aperture. One type of deburring tool includes a tool member having an elongated slot therein and a cutting blade including an elongated portion which allows the blade to flex within the slot when the tool enters an aperture. The blades are replaceable; however, the blades are expensive and cumbersome to remove from the tool holder and to replace. Another type of prior art deburring tool includes a tool member including means for allowing the tool member to flex; however, these tool members have tended to be very fragile and susceptible to breakage. Therefore, none of the aforementioned prior art patents teaches the combination of a deburring tool which includes a flexible tool holder and a simply constructed cutting member which is easily replaced.

SUMMARY OF THE INVENTION

The instant invention provides a deburring tool comprising an axially elongated tool holder having a longitudinal axis of rotation wherein the tool holder has a first body portion adapted for attachment to a rotatable driving member to rotate the tool holder about the axis and a second body portion extending axially from the first body portion and including a seating slot having seating shoulders for seating a cutting blade. The first and second body portions are joined by a flexible neck portion allowing the second body portion to flex in cantilever fashion relative to the first body portion as the tool holder is rotated in use. The deburring tool further includes a cutting blade including seating shoulders and an expandable pin for removably mounting the cutting blade in the seating slot with the seating shoulders of the cutting blade seated against seating shoulders of the seating slot of the tool holder.

PRIOR ART STATEMENT

Examples of prior art patents which disclose a deburring tool having a removable cutting insert are the U.S. Pat. Nos. 4,086,018 to Robinson issued Apr. 25, 1978 and 4,147,463 to Robinson issued Apr. 3, 1979. The aforementioned patents disclose an assembly including means which allow the cutting insert to flex or pivot. Both patents require replaceable blade members having additional portions for allowing the blades to flex; hence, these blades are quite expensive to continually replace.

The U.S. Pat. No. 3,841,785 to Werther issued Oct. 15, 1974 teaches a cutting tool including a cutting element secured in a longitudinal slot in the shaft of a boring bar. The Werther patent does not include means for firmly seating the cutting element within the slot; thus, the cutting element can become misaligned with continued use of the tool.

The instant invention solves the above problems by providing a cutting tool which includes a relatively inexpensive replaceable blade and means for firmly seating the blade within the tool holder.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view of a preferred embodiment of the instant invention showing the deburring tool in relation to a hole to be deburred;

FIG. 2 is an enlarged, partially broken-away fragmentary view of FIG. 1;

FIG. 3 is a cross-sectional view taken substantially along line 3—3 of FIG. 2 and illustrating the tool in relation to the hole to be deburred; and FIG. 4 is a bottom view of the cutting blade taken substantially along lines 4—4 of FIG. 2.

DESCRIPTION OF PREFERRED EMBODIMENT

A deburring tool constructed in accordance with the instant invention is generally shown at 10 in FIG. 1.

The deburring tool 10 includes an axially elongated tool holder generally indicated at 12 having a longitudinal axis of rotation. The tool holder 12 has a first body portion 14 adapted for removable attachment to a driving means to rotate the tool holder 12 about the longitudinal axis thereof. The first body portion 14 includes a notch 16 which can be engaged by a conventional locking means of the driving means for securing the deburring tool 10 to the driving means. Other methods well-known in the art can be used for securing the tool holder 10 to the driving means.

The tool holder 12 also includes a second body portion 18 extending axially from the first body portion 14. The second body portion 18 includes seating means to be described hereinafter for removably seating a cutting blade 20 therein.

The first and second body portions 14 and 18 of the tool holder include axially adjacent portions 22 and 24 which are tapered axially and radially inwardly toward each other to form a flexible neck portion 26 of reduced diameter. The flexible neck portion 26 allows the second body portion 18 to flex in cantilever fashion relative to the first body portion 14 as the tool holder is rotated in use, as will be described more fully hereinafter.

The cutting blade 20 includes an integral blade body of hardened steel or other material suitable for a deburring operation and having substantially parallel side walls 40 joined at their radially outermost ends by a pilot wall 48 which has a shallow arcuate curvature in cross section as illustrated particularly in FIG. 3 for piloting the cutting blade within the bore of a drilled hole or passageway, the ends of which are to be deburred and as will appear more fully hereinafter. A pair of flat seating shoulders 42 are disposed in substantially the same plane and join the parallel side walls 40 of the blade body in axially spaced relation to each other. The respective seating shoulders 42 and the respective ends of the pilot wall 48 of the blade body are joined by edge walls 45 and 47. Each of the edge walls extends radially outwardly from the respective seating shoulders 42 and are provided with respective cutting edges 56 and 58. It will be noted that the respective cutting edges 56 and 58 slope or are inclined radially outwardly and axially inwardly toward each other to perform the deburring operation as will be hereinafter described.

A seating means includes a first slot generally indicated at 32 communicating with the exterior of the second body portion 18. The first slot 32 extends substantially parallel and radially inwardly relative to the longitudinal axis of the tool holder 12. The seating means further includes a second arcuately shaped slot generally indicated at 34 communicating with the first slot 32 and extending radially inwardly therefrom relative to the longitudinal axis of the tool holder 12. The first slot 32 includes side walls 36. The second arcuately shaped slot 34 includes side walls 37. Each of the side walls 36 and 37 are parallel radially extending side walls respectively disposed in substantially common parallel planes for mating engagement with corresponding opposed substantially parallel side walls 40 of the cutting blade 20 removably seatable therebetween, thereby preventing lateral movement of the blade 20 when the blade is seated therein.

The juncture between the first and second slots 32 and 34, respectively, defines an axially spaced and opposed pair of locking shoulders 38 engageable with corresponding shoulders 39 of the cutting blade 20 thereby preventing axial displacement of the latter relative to the longitudinal axis of the tool holder 18. Furthermore, the axially spaced radially outward facing seating shoulders 44 of the first slot 32, which are disposed on each side of the second slot 34, are engageable with the corresponding seating shoulders 42 of the cutting blade 20 so as to prevent radially inward displacement of the latter relative to the longitudinal axis. A respective one of each of the seating shoulders 44 is immediately contiguous to and joined with a respective one of the locking shoulders 38. In other words, the mating of the shoulders 38 and 44 of the tool holder 12 with the shoulders 39 and 42 of the cutting blade 20 fixedly secure the cutting blade 20 within the tool holder 12, thereby preventing any displacement of the cutting blade 20 in either an axial or inward direction.

The cutting blade 20 is removably seatable within the seating means with the side walls 40 of the blade body 43 matingly engaged with the side walls 37 of the slot means and the seating 42 and locking 39 shoulders of the cutting blade 20 respectively seated against the seating 44 and locking 38 shoulders of the seating means.

The assembly 10 includes means for removably mounting the cutting blade 20 in the seating means. As shown in FIG. 3, the cutting blade 20 includes an opening 50 extending between the side walls 40 thereof at a location remote from the cutting edge 48. The second body portion 18 of the tool holder 12 includes an opening 52 extending therethrough in a plane substantially perpendicular to the plane of the longitudinal axis and being alignable with the opening 50 of the blade body 43. An expandable pin 54 is removably insertable through the aligned openings 50 and 52 to removably mount the cutting blade 20 in the tool holder 12. The expandable pin 54 draws the shoulders 39 and 42 of the cutting blade 20 against the shoulders 38 and 44 of the slot means so as to fixedly secure the cutting blade 20 within the tool holder 12. The cutting blade 20 can be easily removed from the tool holder 12 by removing the pin 54 and quickly replaced by a new blade.

In operation, a cutting blade 20 is mounted and seating within the tool holder as described above, and the tool holder is attached to a suitable drive means to rotate the tool holder about the longitudinal axis of rotation thereof which is substantially aligned with the longitudinal axis of a previously drilled bore 29 of a workpiece 30 as illustrated in FIG. 1. The bore 29 has at least one end or opening 28 to be deburred, but the tool of this assembly is particularly designed for deburring operations where the bore 29 is a through-bore having an end opening 28 at each end thereof to be deburred.

As the tool initially enters the opening 28, the root portion or portion of the cutting edge 56 most immediately adjacent to a seating shoulder 42 will initially engage the end of the opening 28 to begin deburring the latter. As the tool continues moving into the bore 29, the remaining portion of the cutting edge 56 radially outwardly from the seating shoulder 42 continues the deburring operation while, at the same time, the flexible neck portion 26 allows the second body portion 18 of the tool holder to flex in cantilever fashion relative to the first body portion 14 as the tool holder continues to rotate. In other words, as the inclined cutting edge 56 progressively enters and passes through the opening 28, the second portion 18 of the tool holder is deflected radially inwardly from the longitudinal axis of the tool holder. Therefore, the second portion 18 of the tool holder exerts a continuous radial outward pressure on the cutting edge 56.

As the tool continues its pass through the bore 29, ultimately the cutting edge 56 is disposed entirely within the bore 29 and the pilot portion 48 of the blade body slidably rotates about the inner diametrical wall of the bore 29. No cutting, deburring or any other metal removal takes place at this time, although the second body portion 18 of the tool holder continues to exert a radial outward pressure on the cutting blade but the pilot portion 48 prevents any cutting action from occurring.

As the pilot portion 48 of the blade moves out of the end 28 at the other end of the bore 29, the other end opening is deburred by the cutting edge 58. In other words, the inclined cutting edge 58 progressively engages the other end opening from a point on the cutting edge 58 immediately adjacent the pilot portion 48 toward, and radially inwardly toward, its corresponding seating shoulder 42. While this is occurring, the second portion 18 of the tool holder gradually moves radially outwardly until such time as the entire blade has passed through the bore 29 at which time the respective tool holder body portions 14 and 18 are no longer cantilevered with respect to each other.

As will be immediately apparent to those skilled in the art, the deburring operation is repeated at both open ends 28 of the bore 29 when the deburring tool is removed from the bore 29. In other words, in withdrawing the tool from the bore, the cutting edge 58 will again debur the other end opening 28 and the cutting edge 56 will again debur the opening 28 shown in FIG. 1 of the drawings as the edge 56 is removed from the end opening.

The invention has been described in a illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A deburring tool comprising an axially elongated tool holder having a longitudinal axis of rotation, said tool holder having a first body portion adapted for attachment to a rotatable driving means to rotate said tool holder about said axis and a second body portion extending axially from said first body portion and including seating means for seating a cutting blade, said first and second body portions being joined by a flexible neck portion allowing said second body portion to flex in cantilever fashion relative to said first body portion as said tool holder is rotated in use, said seating means comprising axially and radially inwardly extending slot means communicating with the exterior of said second body portion and having a pair of axially spaced radially outwardly facing seating shoulders, a cutting blade having a pair of axially spaced seating shoulders, and means for removably mounting said blade in said seating means with said seating shoulders of said cutting blade seated against said seating shoulders of said slot means.

2. The invention as defined in claim 1 wherein said slot means is disposed substantially in a plane containing said axis and includes a pair of opposed substantially parallel side walls joined by said seating shoulders of said slot means, said cutting blade including a pair of opposed substantially parallel side walls joined by said seating shoulders thereof, said side walls of said blade being matingly engageable between said side walls of said slot means.

3. A deburring tool comprising an axially elongated tool holder having a longitudinal axis of rotation, said tool holder having a first body portion adapted for removable attachment to a rotatable driving means to rotate said tool holder about said axis and a second body portion extending axially from said first body portion and including seating means for removably seating a cutting blade, said first and second body portions being joined by a flexible neck portion allowing said second body portion to flex in cantilever fashion relative to said first body portion as said tool holder is rotated in use, said seating means comprising axially and radially inwardly extending slot means communicating with the exterior of said second body portion and disposed substantially in a plane containing said axis, said slot means including a pair of opposed substantially parallel side walls joined by a pair of axially spaced radially outwardly facing seating shoulders and a pair of axially spaced and facing locking shoulders, a respective one of each of said seating shoulders being immediately contiguous to and joined with a respective one of each of said locking shoulders, a cutting blade having a pair of axially spaced seating shoulders disposed in a substantially common plane and a pair of axially spaced locking shoulders, a respective one of each of said last-named seating shoulders being immediately contiguous to a respective one of each of said last-named locking shoulders, said shoulders of said blade extending between substantially parallel side walls of the latter, and means for removably mounting said blade in said seating means with said side walls of said blade matingly engaged between said side walls of said slot means and said seating and locking shoulders of said cutting blade respectively seated against said seating and locking shoulders of said slot means.

4. The invention as defined in claim 3 wherein said means for removably mounting said cutting blade in said seating means comprises an opening extending through said blade, an opening extending through said second body portion and said slot means in a plane substantially perpendicular to the plane containing said axis and being alignable with said opening in said blade, and pin means removably insertable through said aligned openings to removably mount said blade in said tool holder.

5. An assembly as set forth in claim 4 wherein said first and second body portion of said tool holder include inwardly tapered portions tapering toward said flexible neck portion.

6. An assembly as set forth in claim 5 wherein said slot means includes an arcuately disposed slot in said second portion having opposed substantially parallel side walls.

7. An assembly as set forth in claim 6 wherein said pin means includes an expandable pin being removably disposed within said aligned openings in said second portion and in said cutting blade.

* * * * *